No. 730,432. PATENTED JUNE 9, 1903.
D. G. BAKER.
MACHINE FOR PACKING BOBBINS, COPS, OR THE LIKE.
APPLICATION FILED SEPT. 17, 1902.
NO MODEL. 5 SHEETS—SHEET 5.

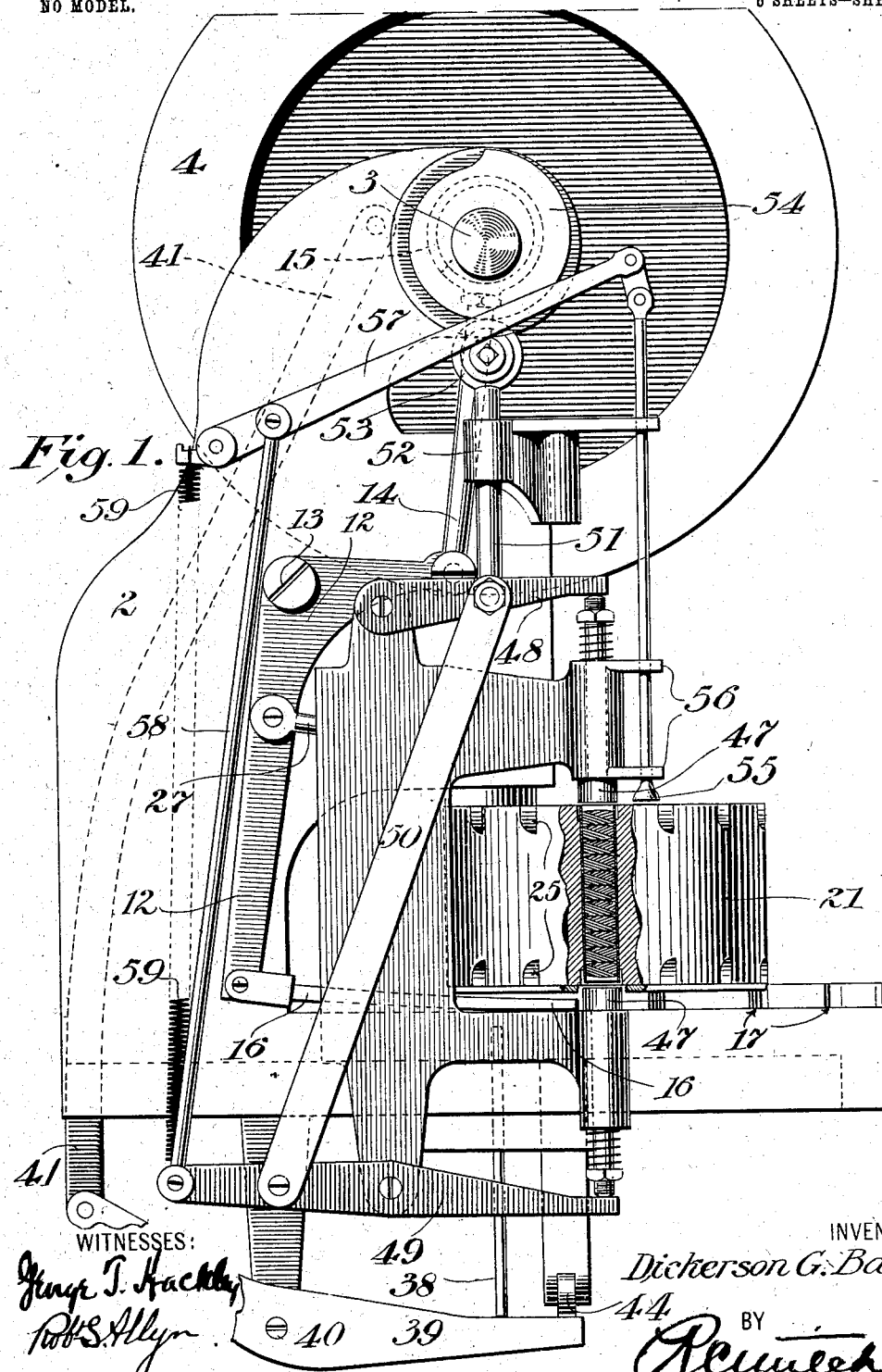

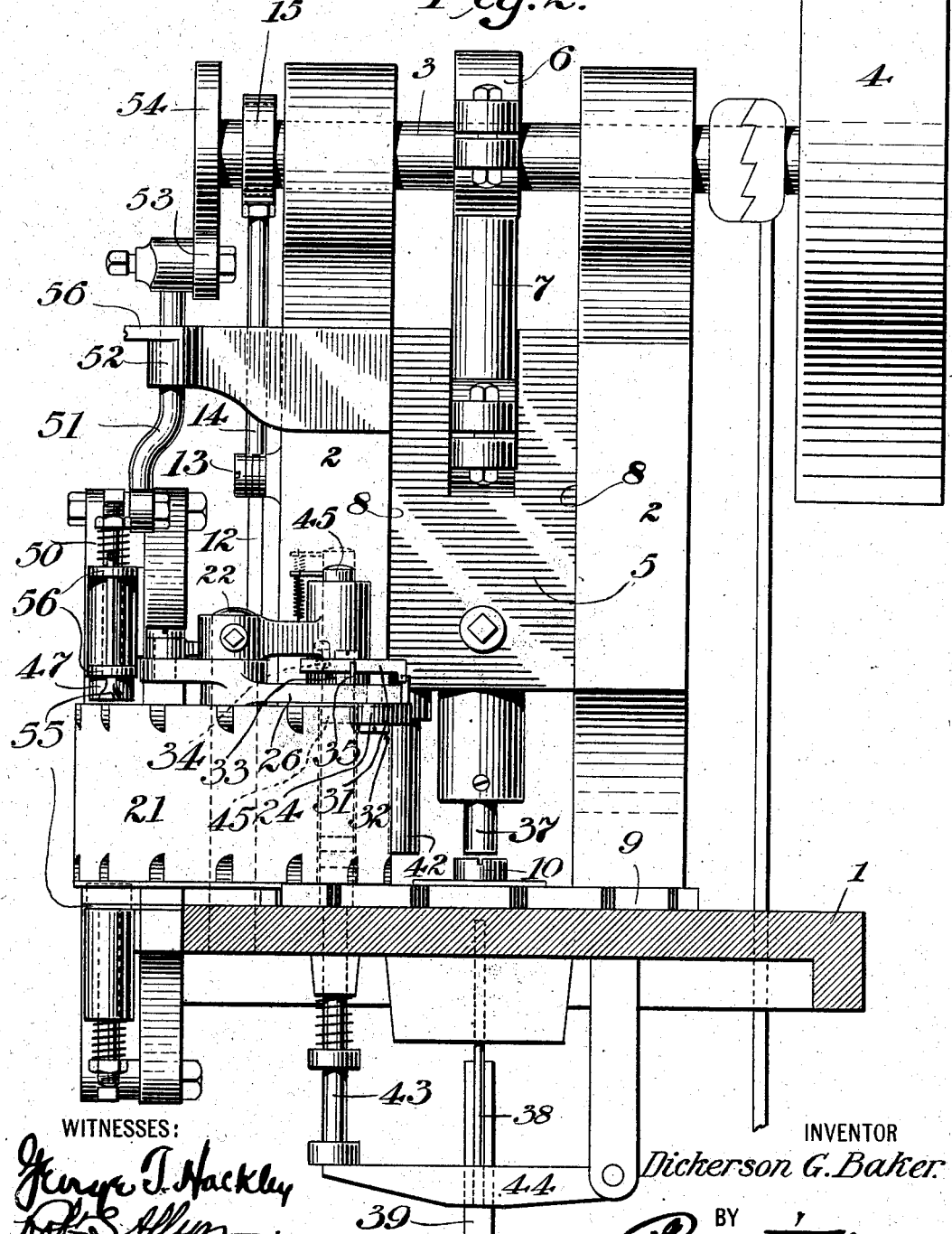

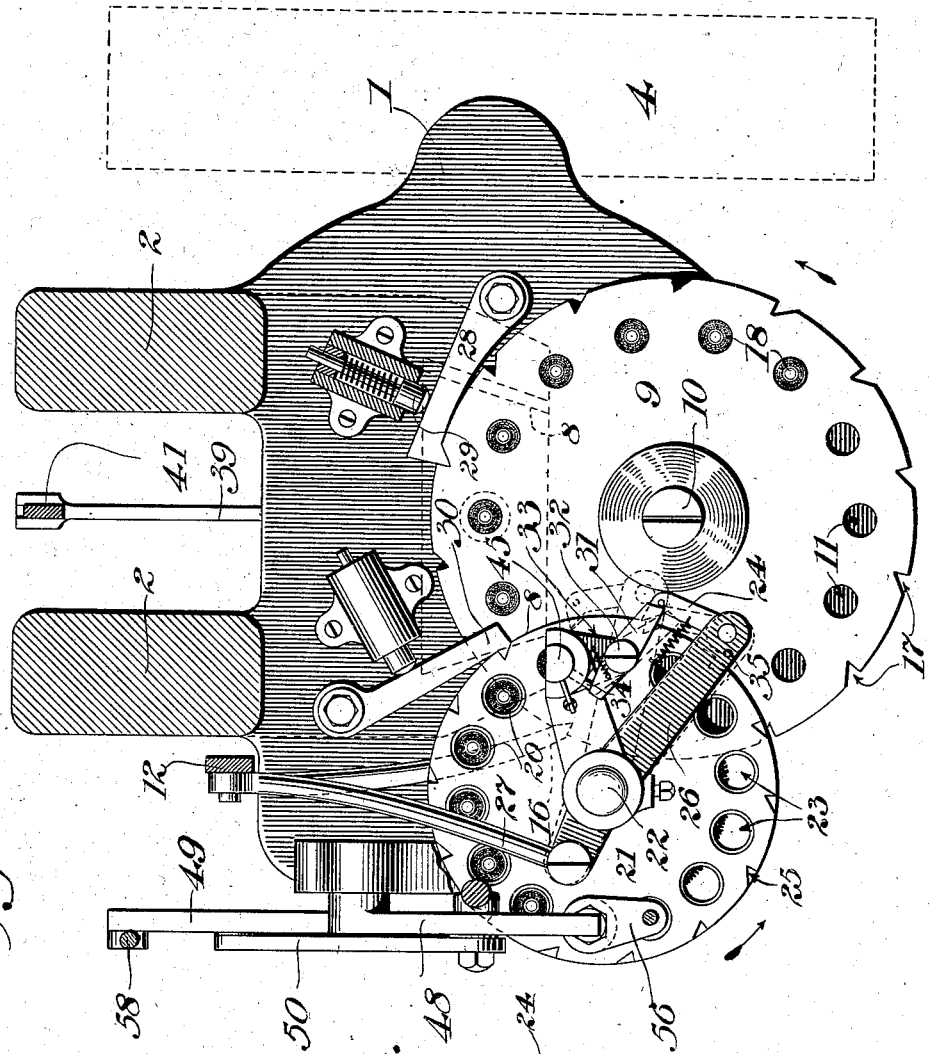

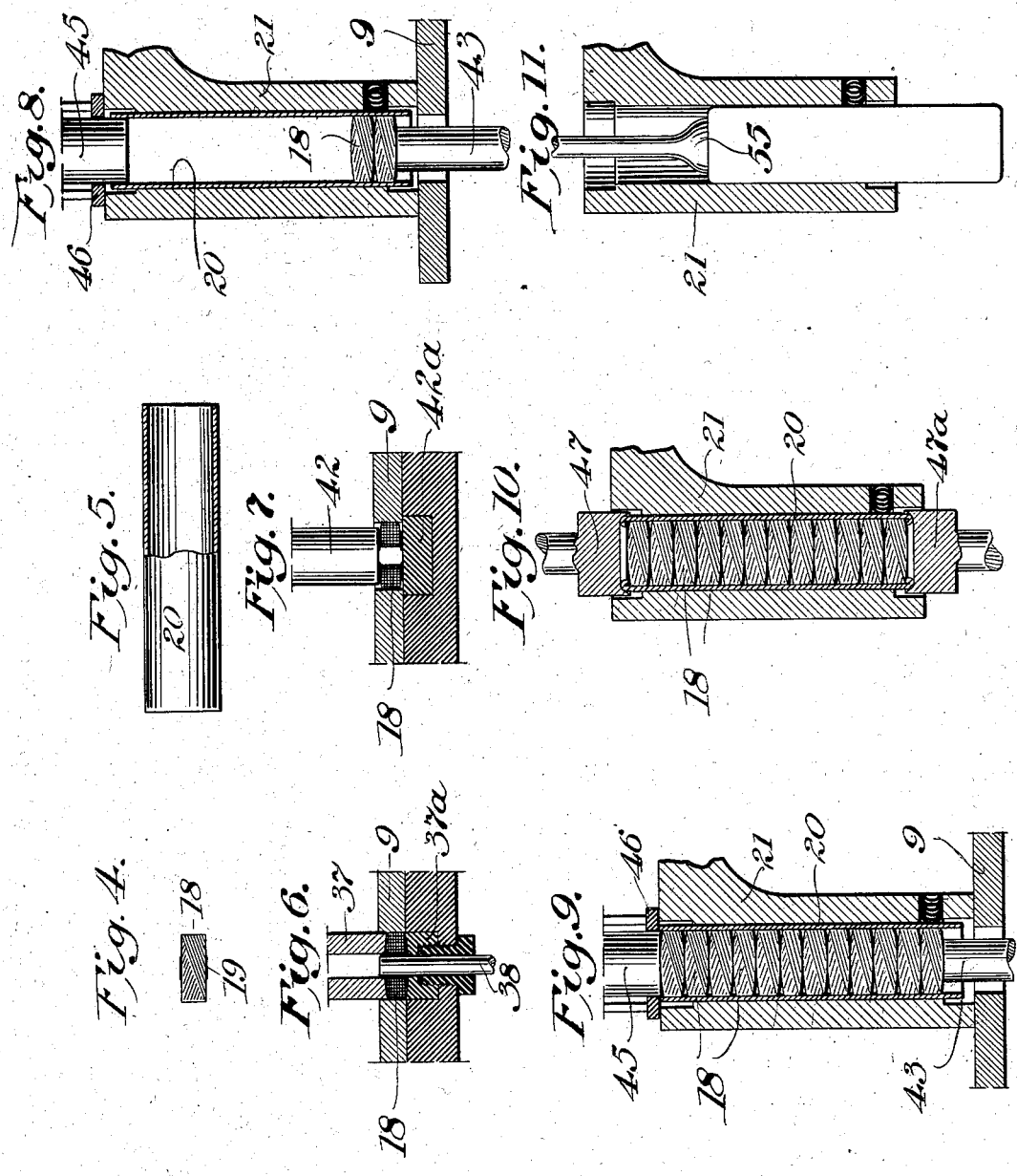

WITNESSES:
George J. Hackley
Rob S. Allyn

INVENTOR
Dickerson G. Baker
BY
R. Cutcheon
ATTORNEY

No. 730,432.

Patented June 9, 1903.

UNITED STATES PATENT OFFICE.

DICKERSON G. BAKER, OF WILLIMANTIC, CONNECTICUT, ASSIGNOR TO THE AMERICAN THREAD COMPANY, A CORPORATION OF NEW JERSEY.

MACHINE FOR PACKING BOBBINS, COPS, OR THE LIKE.

SPECIFICATION forming part of Letters Patent No. 730,432, dated June 9, 1903.

Application filed September 17, 1902. Serial No. 123,745. (No model.)

*To all whom it may concern:*

Be it known that I, DICKERSON G. BAKER, a citizen of the United States, residing at Willimantic, Windham county, and State of Connecticut, have invented certain new and useful Improvements in Machines for Packing Bobbins, Cops, or the Like, of which the following is a full, clear, and exact description.

This invention relates to machines for packing bobbins, cops, and the like, and particularly to a machine comprising mechanism for inserting a certain number of bobbins or cops into a shell and then reducing the size of the ends of the shell so that the inclosed cops will be retained, thus forming substantially such a package as is shown and described in United States Letters Patent No. 710,937, dated October 14, 1902.

The object of the invention is to provide a machine which will be practically automatic in operation and require a minimum amount of attention.

Further objects, such as simplicity of construction and rapidity and effectiveness of operation, are attained, and all contribute to produce a machine capable of rapidly completing and turning out a large quantity of perfectly-formed packages.

Other advantages of this machine will be brought out in the following description.

Figure 12:
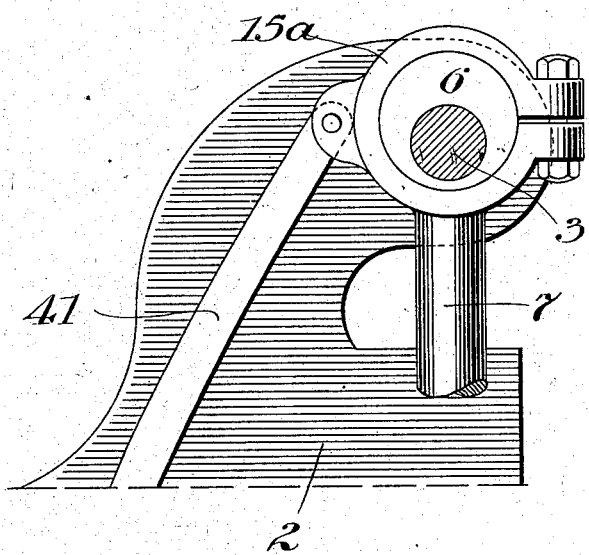
Figure 13:
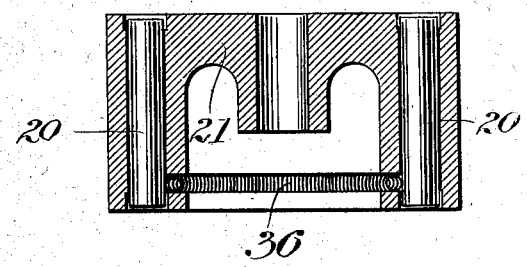

Referring to the drawings, Figure 1 is a side elevation of the machine. Fig. 2 is a front elevation. Fig. 3 is a plan view with the upper portion of the machine removed. Fig. 4 is a view of a cop. Fig. 5 is a view of a cop-holding shell. Figs. 6, 7, 8, 9, 10, and 11 are detail views showing the several operations involved in making the package. Fig. 12 is a detail of the operating-eccentric. Fig. 13 is a sectional view of the magazine. Fig. 14 is a detail of a portion of the mechanism for operating the magazine.

The frame of the machine comprises a table 1 and upright arms 2 2. The table 1 may be supported by suitable legs. (Not shown.)

3 is a shaft which may be driven by a pulley 4, which latter may be driven from any suitable source of power.

5 is a head, which is connected with an eccentric 6 by an eccentric-rod 7 and is reciprocated thereby. The head 5 slides in suitable guideways 8 8 on the arms 2 2.

9 is a revoluble bobbin-carrier pivoted at 10 to the table 1, and 11 11 are chambers therein, which may be arranged in a circle around the axis of said carrier 9.

12 is a bell-crank lever pivoted at 13 and rocked by means of rod 14 and an eccentric 15, which latter rotates with the shaft 3. The carrier 9 is rotated by means of a pawl 16, one end of which is attached to the bell-crank lever 12, while the other end engages notches 17, formed in the periphery of the carrier 9.

Referring to Fig. 4, 18 is a cop such as is commonly wound upon a hollow core 19, which core is ordinarily formed of a stiff and light material—such, for instance, as thick paper.

Referring to Fig. 5, 20 is a shell in which the cops 18 are to be packed. The shells 20 as ordinarily constructed are of paper, but may be of any suitable material. Each chamber 11 of the carrier 9 may be of a size large enough to receive a cop 18. In this embodiment the chambers 11 extend through the carrier 9 and the cops are held in the chambers by the table 1.

21 is a revoluble magazine journaled on a pin 22. 23 represents chambers in said magazine for receiving and retaining the shells 20 during the several operations of the packing process. The magazine 21 is rotated by means of a pawl 24, which engages peripheral notches 25, formed therein. The pawl 24 may be carried by a rocker-arm 26, which rocker-arm may preferably be journaled on the pin 22. The rocker-arm 26 may be connected with the bell-crank lever 12 by a rod 27 and oscillated thereby.

28 is a retaining-pawl for the cop or bobbin carrier 9, against which it may act by a spring-pressed knob 29. 30 is a similar retaining-pawl for the magazine 21.

Each oscillation of the rocker-arm 26 carries the pawl 24 to the positions shown by dotted lines in Fig. 3; but the pawl is normally held out of engagement with a new notch by means of a spring-latch 31, which may be pivoted at 32 to a stationary bracket 33. The latch 31 may normally be held in the position shown in Fig. 3 by means of a pin 34, carried by a plunger 45, hereinafter described. When the pin 34 is raised, the latch is permitted to spring against a projection on the bracket 33, taking the position shown by dotted lines in Fig. 3, thus allowing the pawl 24 to spring in and enter a new notch in the magazine and to thereby advance the magazine when it moves forward. While the pawl 24 is advancing the magazine a pin 35, carried by the rocker-arm 26, strikes the latch 31 and throws it back to normal position, the pin 34 at the same time falling into its normal position in time to hold the latch 31 in the position shown in Fig. 3, thus preventing the pawl 24 from advancing the magazine again until the proper time.

A shell 20 may be inserted into each chamber of the magazine 21. It is preferable to have the shells fit easily into the chambers 23, and to prevent them dropping out a suitable spring 36 (preferably spiral) may be placed in an internal annular groove in the magazine, so that a portion of the spring projects slightly into each chamber, as shown in Figs. 3 and 13. This forms a very simple and convenient means for frictionally holding the shells in the chambers.

The cops are placed in the chambers in the carrier 9. At each upward movement of the head 5 the carrier 9 is advanced one step, as before explained. The first operation is one which presses the cop into a compact shape, and if it is also desired to give the cop a particular shape—for instance, one with convex ends, as shown in the drawings, Fig. 6 to 10, inclusive—dies 37 and 37$^a$ may be employed. The die 37 may be carried by the head 5, and the die 37$^a$ may be fixed in the table below the carrier 9. In Fig. 3 the pawl 16 has advanced the carrier 9, so that a cop is positioned under the die 37 and resting on the die 37$^a$, Fig. 6. The carrier is held stationary in this position while the head 5 descends and the dies 37 and 37$^a$ squeeze and press the cop in the manner desired. Just before the dies 37 and 37$^a$ have commenced to press the cop a spindle 38 is pushed up through the core far enough to just enter the die 37 in order to prevent the core from collapsing. The spindle is adjusted to move up with a comparatively quick motion, so that it will fill the entire length of the core before the dies 37 37$^a$ exert any substantial pressure on the cop. The spindle 38 may be actuated by a lever 39, which lever is pivoted at 40 and in turn moved by a link 41, which link in turn is connected to the eccentric-strap 15$^a$ and moved thereby. After the die 37 rises, the plate 9 is rotated another notch, and the cop comes under a flat die 42 and above a similar die 42$^a$, Fig. 7. The die 42 may also be carried by the head 5. When the dies 42 42$^a$ act, they flatten down slight rims formed by the exposed ends of the core 19, so that they will be substantially flush with the ends of the cop. At the next partial rotation of the plate 9 the cop is brought under one of the chambers of the magazine, and at the next downward movement of the head a filler 43 rises rapidly and pushes the cop up into the shell. (See Fig. 8.) Obviously the entering cop must push up those already in the shell. The plunger 43 is actuated by a lever 44, which lever 44 is in turn moved by lever 39. When the shell becomes filled, as shown in Fig. 9, the plunger 45 is pushed up by the cops below it. The plunger 45 carries the pin 34, previously described, and the pin 34 thus being raised the magazine is rotated by the pawl 24 to bring an empty shell into place, as before described. The plunger 45 when in the position shown in Fig. 8 also acts as a lock to positively hold the magazine in position.

46 is a stationary ring which lies immediately above the shell and prevents it from rising, for as the cops are pushed in as the shell is being filled there may be considerable friction developed, and the spring 36 cannot be relied on to positively hold the shell from upward movement. The shell when filled with cops is next brought within crimping-dies 47 47$^a$. (Shown in Fig. 1 and in detail in Fig. 10.) These crimping-dies are moved by levers 48 and 49, which levers are connected by a link 50. A rod 51 is attached to the lever 48 and is supported by passing through a bracket 52, and this rod carries a roller 53, which bears against a cam 54, which cam rotates with the shaft 3. The cam 54 causes the crimping-dies to act gradually, and Fig. 10 shows the dies crimping the ends of the package. The crimping-dies act at each stroke of the head 5 and effect the perfect contracting and upsetting of the ends of the package. At the next movement of the magazine the package, now completely formed, comes under an ejector 55, which may be guided by brackets 56 and operated by the lever 57 and the link 58, which latter is operated by lever 49. A spring 59 may return the lever 49 and the ejector to normal position. Fig. 11 shows a completed package being pushed out by the ejector. As the chambers of the magazine become empty they may be refilled with the shells and the carrier 9 may be kept supplied with the cops while the machine is running.

In this description the preferred construction has been referred to; but it should be understood that many variations may be made in the embodiment herein disclosed without departing from the spirit and scope of my invention.

What I claim is—

1. In a machine for packing bobbins, cops, and the like, a movable magazine, chambers therein for holding shells, notches in said magazine, a pawl for actuating said magazine, a plunger controlled by a cop, and means controlled by said plunger for bringing said pawl into engagement with said magazine, and means for moving said pawl.

2. In a machine for packing bobbins, cops, and the like, a movable magazine, chambers therein for holding shells, notches in said magazine, a pawl for actuating said magazine but normally disengaged therefrom, a plunger controlled by a cop and means controlled by said plunger for bringing said pawl into engagement with said magazine, and means for moving said pawl.

3. In a machine for packing bobbins, cops, and the like, a movable magazine for holding shells, notches in said magazine, a pawl for engaging said notches, a latch for normally holding said pawl out of engagement with said notches, a cop-controlled plunger, a projection on said plunger in engagement with said latch, said plunger when raised releasing said latch and said latch releasing said pawl and allowing the same to move said magazine and means for moving said pawl.

4. In a machine for packing bobbins, cops, and the like, a movable magazine for holding shells, notches in said magazine, a pawl for engaging said notches, a spring-latch for normally holding said pawl out of engagement with said notches, a cop-controlled plunger, a projection on said plunger normally in engagement with said latch, said plunger when raised releasing said latch and said latch releasing said pawl and allowing the same to move said magazine, an arm carrying said pawl, a projection on said arm adapted to strike said latch and restore the same to its normal position, and means to move said arm.

5. In a machine for packing bobbins, cops, and the like, a magazine, chambers therein for holding shells, and a piece of yielding material lying adjacent each chamber, a portion of said material slightly projecting into each chamber.

6. In a machine for packing bobbins, cops, and the like, a magazine, chambers therein for holding shells, an annular groove connecting said chambers, and a spiral spring in said groove, portions of said spiral spring projecting slightly into each chamber.

7. In a machine of the character described a device for holding a plurality of cops, a device for holding a shell, automatic means arranged to introduce successively a plurality of cops into said shell thereby forming a package, a means to crimp the ends of said shell, said means being automatically controlled, a locking device therefor, said locking device being adapted to be operated by one of the cops in said shell.

8. In a machine of the character described a revoluble shell-magazine, a revoluble cop-carrier located adjacent thereto but eccentric thereof, means for moving the cop-carrier a plurality of steps relatively to a single step of the shell-carrier, means to transfer a series of cops from said cop-carrier into a single shell in said shell-magazine, shell crimping and ejecting mechanism normally locked against operation and adapted to be automatically unlocked when the shell is filled with the desired number of cops.

9. In a machine for packing bobbins, cops and the like, a movable magazine, chambers therein for holding shells, means for actuating said magazine intermittently, means for automatically locking the magazine in position, a plunger controlled by a cop and means controlled by said plunger for releasing the locking mechanism and throwing the magazine-actuating mechanism into operation.

10. In a machine for packing bobbins, cops and the like, a rotatable cop-carrier and a series of chambers in the same arranged to hold a series of cops, a revoluble magazine adjacent thereto and a series of chambers therein for holding a series of shells, means for rotating the cop-carrier to bring a succession of cop-chambers under one of the shell-chambers in the magazine, means for rotating the magazine when a predetermined number of cops have been introduced in a single one of the shells carried thereby.

11. In a machine for packing bobbins, cops and the like, a rotatable cop-carrier and a series of chambers in the same arranged to hold a series of cops, a revoluble magazine adjacent thereto and a series of chambers therein for holding a series of shells, means for rotating the cop-carrier to bring a succession of cop-chambers under one of the shell-chambers in the magazine, means for rotating the magazine when a predetermined number of cops have been introduced in a single one of the shells carried thereby, and means for crimping the end of a filled shell.

12. In a machine for packing bobbins, cops and the like, a rotatable cop-carrier and a series of chambers in the same arranged to hold a series of cops, a revoluble magazine adjacent thereto and a series of chambers therein for holding a series of shells, means for rotating the cop-carrier to bring a succession of cop-chambers under one of the shell-chambers in the magazine, means for rotating the magazine when a predetermined number of cops have been introduced in a single one of the shells carried thereby, and means for crimping both ends of a filled shell.

13. In a machine for packing bobbins, cops and the like, an intermittently-rotatable shell-magazine, a plurality of shell-chambers therein, an intermittently-rotatable bobbin-carrier, a plurality of bobbin-chambers therein, means for supporting shells in said magazine and means for supporting bobbins in said carrier, said carrier being revoluble eccentrically of said magazine and below the same, means for moving the bobbin-carrier step by step, and means for moving the magazine-carrier step by step, the bobbin-carrier being adapted to be moved a plurality of steps to a single step of the magazine.

14. In a machine for packing bobbins, cops and the like, an intermittently-rotatable shell-magazine, a plurality of shell-chambers therein, an intermittently-rotatable bobbin-carrier, a plurality of bobbin-chambers therein, means for supporting shells in said magazine and means for supporting bobbins in said carrier, said carrier being revoluble eccentrically of said magazine and below the same, means for moving the bobbin-carrier step by step, and means for moving the magazine-carrier step by step, the bobbin-carrier being adapted to be moved a plurality of steps to a single step of the magazine, and mechanism for transferring the contents of a plurality of said bobbin-chambers into one of the shell-chambers in said magazine, and crimping and ejecting mechanism adapted to coöperate with the other mechanism in finishing and ejecting a loaded bobbin-package.

15. In a machine of the character described, a revoluble magazine, shell-chambers therein, means for revolving the same step by step, a revoluble bobbin-carrier located underneath said magazine and mounted eccentrically thereof, bobbin-chambers in said carrier, a plurality of said chambers intermittently registering with one of the chambers in said magazine, a crimping and ejecting mechanism, all automatically coöperating to load a single shell with a plurality of bobbins and to crimp and eject the same.

16. In a machine of the character described a shell-carrying magazine, a reciprocating die arranged to move relatively thereto to crimp the shell contained therein, in combination with a bobbin-carrier and means coöperating therewith to feed a succession of bobbins to the shell-magazine in advance of the operation of the crimping-die, said shell-magazine being located over said bobbin-carrier.

17. In a machine for packing bobbins, cops and the like, a cop-carrier arranged to hold a plurality of cops, a magazine arranged to hold a plurality of shells, means to move the cop-carrier independently of the shell-carrier, means to project a plurality of bobbins into said shell, and means to then shift the shell-carrier and bring another shell into position for filling.

18. In a machine for packing bobbins, cops and the like, a cop-carrier arranged to hold a plurality of cops, a magazine arranged to hold a plurality of shells, means to move the cop-carrier independently of the shell-carrier, means to project a plurality of bobbins into said shell, and means to then shift the shell-carrier and bring another shell into position for filling, means for crimping the open end of the filled shell during the process of filling the succeeding shell.

19. In a machine for packing bobbins, cops and the like, a cop-carrier arranged to hold a plurality of cops, a magazine arranged to hold a plurality of shells, means to move the cop-carrier independently of the shell-carrier, means to project a plurality of bobbins into said shell, and means to then shift the shell-carrier and bring another shell into position for filling, means for crimping the open end of the filled shell during the process of filling the succeeding shell, and means for ejecting a filled and crimped shell during the process of filling and crimping the next two preceding shells.

DICKERSON G. BAKER.

Witnesses:
R. C. MITCHELL,
L. VREELAND.